Patented Feb. 28, 1928.

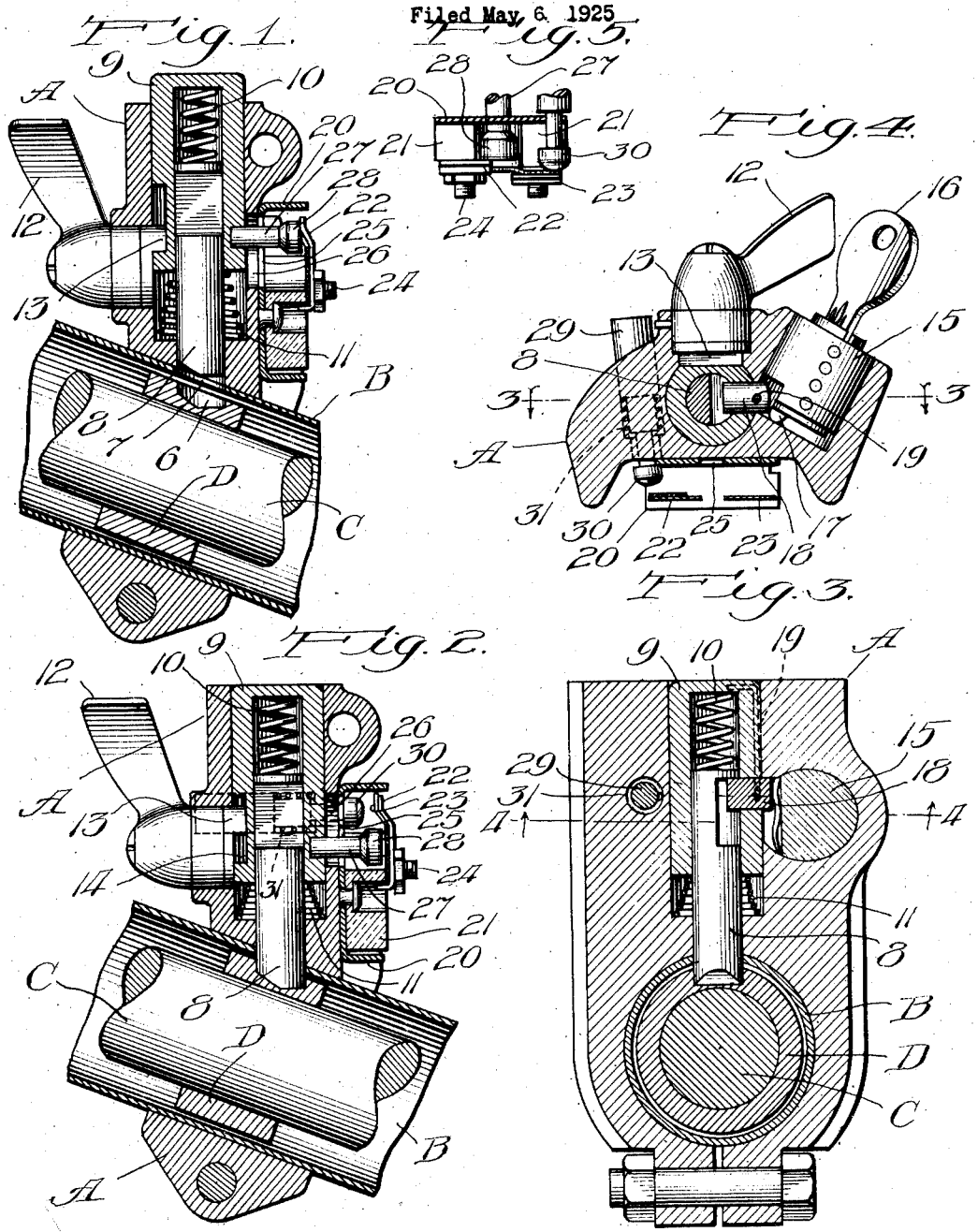

1,660,931

UNITED STATES PATENT OFFICE.

GURDON C. MATHER, OF DETROIT, MICHIGAN, AND ORVILLE S. HERSHEY, OF CHICAGO, ILLINOIS, ASSIGNORS TO HERSHEY MANUFACTURING COMPANY, OF DENVER, COLORADO, A CORPORATION OF COLORADO.

AUTOMOBILE LOCK.

Application filed May 6, 1925. Serial No. 28,300.

This invention relates to a lock adapted especially for automobiles, and designed more particularly for association with one of the operating units thereof. It may be connected with a steering mechanism, a change speed mechanism, a motor ignition circuit, or any other unit or system whose operation is required in the use of the vehicle.

The embodiment of my invention which is herein shown and described, includes a switch which may be interposed in the motor ignition circuit. Such a switch is designed to be opened, thereby disabling the motor, whenever the lock is operated to interfere with the use of an associated mechanism. It may prove objectionable in some cases, however, to interconnect the switch and lock in a manner whereby operation of the former is dependent upon that of the latter, and so to meet any special contingency which may arise the present lock is equipped with an independently operable auxiliary switch control which may be used in an emergency. Such a control may act upon the main switch which normally is opened or closed only when the lock is actuated in response to movements of its operating means, or upon a supplementary switch which is interposed at any convenient point in the motor ignition circuit. By the use of an auxiliary control of this kind, it is possible to stop the motor without disabling any of the remaining units with which the lock may be associated. Our invention is accordingly concerned with the provision of a lock having the characteristics noted, and with various other objects and purposes which will hereinafter appear.

The exemplification of our invention shown in the accompanying drawing is such as may be associated with a steering mechanism. It is designed for attachment to a fixed part of the vehicle and to the column through which the steering post is extended. The description to follow will accordingly refer to a lock which is adapted especially for co-operation with the steering mechanism, although, as above suggested, it may be elsewhere employed.

In the drawings:

Figure 1 is a vertical section through the present lock and steering column with which it is associated;

Fig. 2 is a similar view showing the locking bolt advanced into engaging relation with the steering post;

Fig. 3 is a longitudinal section taken on line 3—3 of Fig. 4;

Fig. 4 is a transverse section taken on line 4—4 of Fig. 3; and

Fig. 5 is a detail, partly in section, looking toward one end of the switch.

The present lock is contained within a housing A through which is an opening for the accommodation of the column B within which is extended the post C which connects the steering wheel with the swiveled running wheels, usually at the front of an automobile. Secured fast to the post is a collar D having therein a recess or socket 6 which may be brought into register with an opening 7 formed in the column.

In this invention we are not concerned particularly with the form or kind of locking mechanism which is employed. It will suffice to note that the structure shown in the drawing includes a bolt 8 which is adapted to be projected through the opening 7 into the socket 6 so as to lock the steering post against rotation. This bolt is associated yieldingly with a hollow plunger 9 wherein is accommodated a compression spring 10 which tends to project the bolt into locking position. A second spring 11 exerts a force upon the plunger in an opposite direction so as to retract the plunger whenever conditions will permit. Manipulative means by which the plunger movements are controlled may take the form of a handle 12 with which is associated a cam or eccentric 13 adapted to bear against a shoulder 14 which is provided on the plunger, the handle being thereby adapted to move the plunger against the tension of the spring 11. The reverse movements, however, are subject to the control of a lock comprising a cylinder 15 and a removable key 16 for co-operating with the tumblers thereof. At the rear end of the cylinder is a lug 17 adapted when turned in response to movements of the key to exert a cam action on a pin 18 which is movable laterally toward the plunger. A wire spring 19 anchored within a groove of the plunger tends to project the pin outwardly where it is disposed in part within a lateral passage, thereby preventing return movement of the plunger. If, however, the cylinder lock be rotated so as to advance the pin inwardly the required distance, the plunger, together with the locking bolt, may recede to thereby restore the steering mechanism to operativeness.

A lock answering to the preceding description may advantageously be employed in connection with our invention. It may, of course, take other forms, and we would have it noted that so far as the present invention is concered the details of the lock construction are relatively unimportant. The features of novelty with which we are particularly concerned is the ignition switch which may be interconnected with the lock so as to open or close the circuit forming part of the motor ignition system.

As shown, this switch consists of a frame 20 in which is carried an insulating block 21 for the mounting of a pair of spaced brushes 22 and 23, each having one end inwardly inclined and overhanging the block. Suitable posts 24 are provided for the circuit wires to connect with. A slot 25 is also provided in the frame in register with a slot 26 formed in one of the housing walls adjacent the plunger 9. Extending through the two slots is a stud 27 secured to the plunger and provided with a head 28 which is adapted to be moved into contact with the inwardly inclined ends of the two brushes, thereby completing a circuit therebetween. The switch is thus closed when the plunger is in its normal or retracted position, such as occurs when the locking bolt is disengaged from the steering post.

With the same switch we may also associate an independent auxiliary control means, the same comprising a stem 29 which passes through a suitable aperture in the lock housing to present a head 30 in adjacent relation to the inner side of one of the two brushes (see Figs. 4 and 5). A coil spring 31 may be associated with the stem to normally hold the same in retracted position where it remains disengaged from the brush. Should the stem be manually advanced, however, by a pressure sufficient to overcome that of the spring 31, the associated brush 22 will be lifted away from contact with the stud head 28, thereby breaking the circuit. A pressure may be continued upon the stem as long as necessary to stop the motor, but without requiring any operation of the lock which would affect a vital operating unit of the automobile. This auxiliary or emergency switch control will restore itself to closed position the moment that pressure is released from the stem.

An auxiliary control of the general kind just described may, if desired, cooperate with a second switch which is also interposed in the motor ignition circuit. Such a control should be conveniently located, as upon the dash or instrument board. The special conditions which render desirable the use of an auxiliary control, whether associated with its own switch or with a lock-switch of the general kind herein shown, would not exist except for the hook-up existing between such apparatus as the steering mechanism and the main or service ignition switch. It is because this interconnection does not permit stopping of the motor without disablement of the steering that supplementary means should preferably be employed in an emergency for cutting off operation of the motor alone. In using the terms "open" and "closed" with reference to the motor ignition circuit, we have in mind the system of ignition most generally employed, but knowing that magneto-equipped motors may be operated on an open circuit which is the reverse of the prevailing kind, we would have these terms properly interpreted to describe the true situation.

From the preceding description, it should be apparent that the operator has at his command the main or regular ignition switch and also a supplementary control means for operating the same switch in an emergency. According to our invention, if a single switch be used, a duplex operating means therefor is provided, and if two switches be employed, then each may be equipped with its own control. A lock-switch of the kind contemplated may be profitably associated with any one of several of the vital mechanisms of an automobile, such as its steering apparatus, its motor ignition circuit, its gear transmission, or elsewhere, the result in any such case being to disable the vehicle from operating, if the normal controls be used, or to bring the motor to a stop if only the auxiliary control be manipulated. The various details of construction as heretofore set forth are manifestly susceptible of embodiment in forms other than the precise one shown, and any such modifications, in so far as they fall within the purview of the claims below, are to be considered as embraced within the limits of our invention.

We claim:

1. In an automobile having a motor ignition circuit, the combination with a movable part, of a lock associated therewith comprising a member movable into engagement with said part to oppose movement thereof, manipulative means for operating said member, a switch interposed in the motor ignition circuit, means interconnecting the switch and lock whereby both are operated together, and auxiliary control means adapted to open the same switch independently of said lock manipulative means, substantially as described.

2. In an automobile having a motor ignition circuit with an interposed switch, a lock associated with an operating mechanism of the automobile in a manner to disable the use thereof, means interconnecting the switch and lock whereby both are operated together, and an independently operable separate control means for opening the same switch, substantially as described.

3. In an automobile having a motor ignition circuit with an interposed switch, a lock connected for operation with the switch, control means for the lock, and an auxiliary control means for the same switch operable independently of the lock, substantially as described.

4. In an automobile having a motor ignition circuit with an interposed switch, a lock connected for operation with the switch, manipulative means for operating the lock and switch concurrently, and auxiliary manipulative means, including an opposing spring, for opening the same switch independently of the lock manipulative means, substantially as described.

5. In an automobile having a motor ignition circuit with an interposed switch, a lock associated with the switch, means connecting the switch and lock whereby they may be operated together, and other means independent of the lock for opening the same switch at will, substantially as described.

6. In an automobile having a motor ignition circuit with an interposed switch, a lock interconnected with the switch for conjoint operation therewith, a single control means for operating the lock and switch, and other means, spring-opposed, and independently operable of said control means for breaking the ignition circuit, substantially as described.

7. In an automobile having a motor ignition circuit with an interposed switch, a lock interconnected with the switch for conjoint operation therewith, a single control means for operating the lock and switch, and other means for breaking the ignition circuit, spring-opposed, and independently operable of said control means, and located accessibly thereto, substantially as described.

8. In an automobile having a motor ignition circuit with an interposed switch, a lock associated therewith, a connection from the lock to the switch such that the latter is operated in response to movements of the former, a control means for the same switch operable independently of the lock, and tension means acting normally to oppose movement of said control means, substantially as described.

9. In an automobile having a motor ignition circuit with an interposed switch, a lock, means connecting the lock and switch in a manner whereby the latter is operated in response to movements of the former, the switch including in its assembly a yieldable brush, and an auxiliary control means adapted for reciprocal movement to move the brush away from contact with its associated parts whereby the switch may be independently opened, substantially as described.

10. In an automobile having a motor ignition circuit with an interposed switch in which is comprised a pair of spaced brushes and a conductor member movable into and out of engagement therewith, a lock, means connecting the conductor member with the lock whereby it is moved concurrently therewith, and an auxiliary switch control associated with one brush and adapted to remove the same from engagement with the conductor member whereby the electrical circuit may be broken, substantially as described.

11. In an automobile having a motor ignition circuit with an interposed switch in which is comprised a movable conductor member and a pair of brushes for engagement thereby, one of said brushes being yieldable, a lock, a connection between the conductor member and the lock such that the former is moved in response to operation of the latter, and independently operable control means associated with the yieldable brush in a manner whereby the brush may be removed from engagement with the conductor member to thereby open the switch, substantially as described.

12. In an automobile having a motor ignition circuit with an interposed switch in which is included a pair of spaced insulated brushes each having an unsupported yieldable portion, a lock associated with the switch, a conductor member adapted for movement toward and from the unsupported portions of the brushes whereby to establish or disestablish an electrical connection therebetween, a movable mounting for the conductor member comprising a lock having manipulative control means therefor, and an auxiliary switch control movable toward and from the unsupported portion of one of the brushes whereby to deflect the same away from the conductor member to open the switch, substantially as described.

13. In an automobile having a motor ignition circuit with an interposed switch which includes a pair of insulated brushes and a conductor member adapted to establish or disestablish an electrical connection therebetween, a lock which includes a movable bolt to which the conductor member is connected whereby the member is moved in response to operation of the lock, and an auxiliary switch control in cooperative relation to one of the brushes adapted to shift the same away from the conductor member whereby to break the electrical circuit, substantially as described.

GURDON C. MATHER.
ORVILLE S. HERSHEY.